Nov. 5, 1963 F. P. RENNIE 3,109,936

MAGNETIC PULSE FORMING AND COUNTING CIRCUIT

Filed July 19, 1961

INVENTOR.
FRANK P. RENNIE

BY [signature]

ATTY.

3,109,936
MAGNETIC PULSE FORMING AND COUNTING CIRCUIT

Frank P. Rennie, Stamford, Conn., assignor to General Time Corporation, New York, N.Y., a corporation of Delaware Filed July 19, 1961, Ser. No. 125,276
9 Claims. (Cl. 307—88)

The present invention relates to circuits for counting successive pulses and more particularly to an improvement in the pulse forming and counting circuits disclosed in U.S. Patent 2,897,380, issued July 28, 1959, on the application of Carl Neitzert.

It is an object of the present invention to provide a combined pulse forming and counting circuit which is capable of making a reliable count regardless of whether the pulses are periodic or in an irregular sequence. It is another object of the invention to provide a pulse forming and counting circuit which is capable of responding to pulses received at an exceedingly rapid rate.

It is still another object of the present invention to provide a pulse counted which resets itself more rapidly than conventional counters and which is therefore capable of more accurate response to closely spaced input pulses.

It is another object of the invention to provide a pulse forming and counting circuit having a D.-C. power supply and which is capable of producing accurate and reliable results in spite of variations in the supply voltage.

It is a further object of the invention to provide a pulse forming and counting arrangement which provides for convenient adjustment of the "count" or dividing ratio. It is a related object to provide a counting circuit employing a saturable reactor and in which the dividing ratio may be changed by convenient adjustment of the value of a circuit resistor and without necessity for making any changes in the saturable core or its associated windings.

Other objects and advantages of the invention will become apparent upon reading the attached detailed description and upon reference to the drawing in which.

Figure 1:
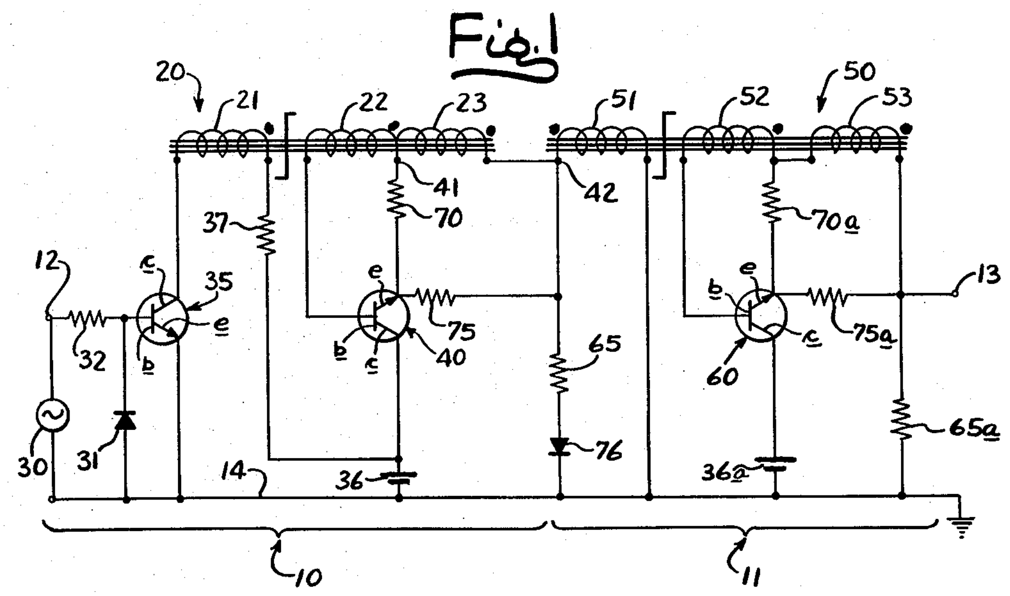
FIGURE 1 is a schematic diagram of a circuit constructed in accordance with the present invention.

While the invention has been described in connection with a preferred embodiment, it will be understood that I do not intend to be limited to the particular embodiment illustrated but intend to cover the various modifications and equivalents which are included within the spirit and scope of the appended claims.

Turning to the drawing the invention has been shown embodied in a counting assembly having two magnetic stages including a pulse forming stage 10 and a counter stage 11. Input pulses are received at an input terminal 12 and output pulses are produced at output terminal 13, with both terminals having a common ground 14. Briefly stated, the function of the counting assembly is to produce an output pulse of predetermined energy or volt-second content upon receipt of a predetermined total number of input pulses. The input pulses may be received periodically or at random intervals. It is one of the features of the present device, in common with that in the patent identified above, that the device "remembers" the received count even though there may be a long time interval between successive ones of the input pulses. Devices of the present type find wide application in electric circuitry, particularly for control and computing purposes. In the present discussion it will be assumed that the counter assembly is to be employed in a computer to provide a dividing ratio of, for example, 10, between the orders of a decimal register.

Referring in more detail to the pulse forming stage 10, the device includes a saturable reactor 20 having a magnetic core and a series of windings thereon. These windings include a saturating winding 21, a triggering winding 22 and a reset winding 23. In the present instance the saturating winding 21 has been shown as separate from the remaining windings although it will be understood by one skilled in the art that a continuous, tapped winding may be employed without departing from the invention. For the details of the saturable reactor 20 reference is made to the above mentioned Neitzert patent. It will suffice to say that the core is made by spirally winding a tape made of a material which is especially formulated and heat treated to produce a sharply defined and more or less rectangular hysteresis loop. Such material is commercially available under the trade name "Mo-Permalloy." The windings consist of turns of fine gauge insulated wire. The operation of the reactor, briefly stated, is as follows. A pulse of current of predetermined polarity and magnitude is applied to the saturating winding 21. Where the stage is employed for pulse forming and where a 1:1 counting ratio is desired, the pulse is made more than sufficient to produce positive saturation of the core. The collapse of the excess magnetic field induces a control voltage in the triggering winding which is employed to trigger a switch causing current to flow in the reset winding sufficient to restore the core to a condition of negative saturation. Flow of the resetting current produces an output pulse which is employed in the successive stage. As more fully described in the above patent, the input circuit feeding the saturating winding 21 may be so adjusted that a predetermined number of input pulses are required to convert the core from the condition of negative to positive saturation for the production of a single output pulse.

Focusing upon the input portion of the circuit 10, the source of input pulses is indicated diagrammatically as a cyclical A.-C. source 30. In order to shunt the negative half cycles to ground, a diode 31 is used, thus, only the positive half cycles are passed on to the remainder of the circuit. In series with the input is a resistor 32 for limiting the flow of input current. Since the input pulses may or may not be of constant magnitude, means are provided for insuring that pulses of constant energy or volt-second content are fed to the saturating winding 21. In the present instance the pulses are gated and amplified by a transistor 35 having base, emitter and collector elements *b*, *e* and *c*, respectively. The collector or output circuit of the transistor is connected in series with the saturating winding 21 to a voltage source 36 and with a resistor 37 in series to limit the current flow when the condition of saturation is reached.

For the purpose of detecting the condition of saturation and for producing immediate flow of reset current a switch is used having a control terminal which is connected to the triggering winding 22 and an output terminal which is connected to feed current to the reset winding for restoring the core to the condition of magnetic saturation. The switch in the present instance is in the form of a transistor 40 having base, emitter and collector terminals *b*, *e* and *c*, respectively. The base or input terminal is connected to the left hand end of the triggering winding. Preferably an NPN, common collector circuit is used, with the emitter terminal being connected to the common connection 41 between the windings 22, 23. The collector is connected to the voltage source 36. The transistor thus controls the flow of current from the source 36 through the reset winding 23 in the transistor output circuit.

With the circuit arranged as shown and with the windings polarized as indicated, an increase of flux resulting from an input pulse tends to drive the transistor 40 further in the direction of cut-off. As stated above, magnetization produced by the saturating coil 21 is more than sufficient to saturate the core. When current stops flowing in the saturating winding, the collapse of the flux induces a control voltage in the winding 22 which is positive as applied to the base of the transistor 40 causing current to flow in the output circuit of the transistor which is in a direction to produce negative saturation in the core. It will also be understood that magnetization in the negative direction causes the positive control voltage to continue to be applied to the base of the transistor so that flow of the resetting current automatically persists until full saturation is achieved in the negative direction. Once saturation is achieved, the voltage at the base terminal of the transistor becomes negative-going thereby turning the transistor off and putting the stage in readiness for the next input pulse.

Turning next to the counter stage 11, which receives its input from the pulse former 10, a saturable reactor 50 is used similar to the reactor 20 in the previous stage and including a saturating winding 51, a triggering winding 52 and a reset winding 53. Connected to the triggering and reset windings is a switch in the form of a transistor 60 having base, emitter and collector terminals *b*, *e* and *c* respectively and with the collector being supplied with current from a voltage source 36*a*, which is identical to the previously mentioned voltage source 36. Operation of the counter stage as thus far described is similar to the pulse former stage in that the saturating winding 51 saturates the core, producing a positive triggering voltage in the triggering winding 52 which is applied to the base of the transistor and which causes the transistor to conduct current from the source 36*a* through the reset winding 53 to restore the core to the condition of negative saturation and for production of an output pulse at the output terminal 13.

In accordance with the present invention a shunting means is provided between the two stages for shunting to ground a portion of the energy or volt-second content of the pulses from the pulse former, thereby reducing the energy of the pulses fed to the saturating winding of the counter so that a predetermined number of such pulses are required to satisfy or "set" the counter stage. Further in accordance with the invention the shunting means is made adjustable so that the dividing ratio of the counter stage may be set anywhere within a predetermined range without necessity for any modification of the saturable reactor and without necessity for using taps on the saturating winding. In the present instance the shunting effect is produced by a shunting resistor 65 which is connected to the junction 42 between the stages and the ground terminal 14. In accordance with one of the more detailed aspects of the invention the reset winding of the pulse former stage is connected directly to the saturating winding 51 of the counter state, and the shunting resistor 65 is connected in the circuit so that a portion of the reset current is fed through the saturating winding 51 while the remainder of the reset current is shunted directly to ground. Thus it will be apparent that with the right hand end of the winding 23 connected to the left hand end of the winding 51, and with the right hand end of the latter winding returned to the ground 14, a series path is established for the output current of the transistor 40 and which comprises the reset current. Starting at the positive terminal of the voltage source 36, current flows through the collector of the transistor 40, thence through the emitter and through the coils 23, 51 back to ground. In this way the reset current of the first stage is directly utilized as the saturating current of the second. However, because of the presence of the shunting resistor 65 between the stages, some of the reset current flows directly to the ground terminal without passing through the saturating winding 51. Stated in another way, by adjustment of the shunting resistor 65 a predetermined portion of the energy in the output pulses from the pulse former 10 is utilized in the counter so that, by proper adjustment of the resistor 65, the counter may be caused to be "set" for production of an output pulse upon receipt of a predetermined and precise number of input pulses.

Figure 2:
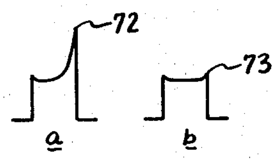
FIG. 2 shows the shape of the wave of reset current.

In accordance with one of the aspects of the invention, a series resistor is interposed in the output circuit of the transistor for cutting down the total reset current to an amount which is only a fraction of that which would tend to flow in the absence of such resistor. Thus I provide, in series with the emitter terminal of the transistor 40, a voltage dropping resistor 70 which is subject to the reset current. This dropping resistor is preferably of such resistance that the maximum value of the reset current, which occurs at saturation, is only 25 to 50% greater than the current before saturation instead of being, say, 200% greater. In order to more clearly visualize the reduction in maximum current which the resistor 70 brings about, reference is made to FIG. 2 which shows at *a*, a conventional pulse of reset current. Here it will be noted that the current wave is of generally square shape, with saturation occurring progressively along the time axis until the core has been fully saturated in the negative direction. When this occurs, the impedance of the reset winding 23 drops suddenly to a value on the order of a few ohms which results in a sudden terminal increase of current as indicated by the current "spike" 72. With the series resistor 70 present, and as shown at *b*, the peak current 73 is substantially reduced.

It has been discovered that the series resistor 70 not only reduces the peak current but also greatly increases the consistency and accuracy of the circuit in the face of changes in the voltage supply 36. Using the series resistor it is found that the voltage may vary over relatively wide limits without substantially affecting the energy content of the pulses at the pulse former output. The improved accuracy which this brings about permits the adjacent windings in the successive stages to be directly connected together as shown without any interposed gating switch making it possible to employ a counter stage having but a single transistor and permitting a high degree of economy.

For the purpose of insuring that no positive control voltage is induced in the triggering winding 22 until saturation of the core in the positive direction has been fully achieved, a damping resistor 75 is provided. This resistor is, in the present instance, connected from the emitter of the transistor 40 to the junction between the saturating winding 51 and the shunt resistor 65. However, it will be apparent to one skilled in the art that the damping resistor may, if desired, be connected directly across the reset winding 23. In the above discussion it has been assumed that the stage 10 acts simply as a 1:1 pulse former. However, it will be apparent to one skilled in the art that the circuit may be adjusted with minor modification to reduce the energy content of the pulses fed to the saturating winding 21 to the point where a predetermined plurality of pulses are required to achieve saturation. Under such circumstances the stage 10 will have a certain dividing ratio between the input and the output and would be more properly characterized as the first stage counter. Where this is done, the presence of the damping resistor 75 in insures that no triggering voltage will be induced in the triggering winding upon the minor collapse of flux which occurs during the intermediate steps and prior to achieving the final, saturating count.

In accordance with one of the detailed aspects of the invention means are provided for alleviating the loading effect of the shunting resistor 65 upon the saturating winding 51 of the counter, which resistor is effectively in parallel with the winding. This is accomplished by interposing in series with the resistor 65 a diode 76. Use of the diode insures a narrow output pulse and is particularly desirable when the count of the succeeding counter is greater than about 6.

In order to make the counter stage relatively independent of fluctuations in the supply voltage, a resistor 70a is interposed in series with the output of the transistor 60, just as in the case of the preceding stage. Moreover, a shunt resistor 65a is preferably employed between the output terminal 13 and ground in order to control the energy level of the output, and with the resistor preferably being adjustable in order to permit variation of the amount in a succeeding stage. Finally, a resistor 75a is effectively shunted across the reset winding 53 for damping purposes and to prevent the collapse of the flux which occurs in the intermediate counting steps from causing triggering of the transistor 60.

Figure 3:
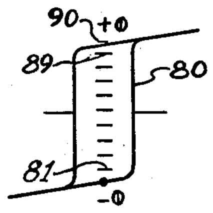
FIG. 3 shows the hysteresis loop of the core in the counter stage.

In a typical counting sequence, and assuming that the circuit has been adjusted, say by adjustment of a resistor 65, for a ten count, the operation of the counter stage is graphically illustrated in FIG. 3. Here the generally rectangular hysteresis loop of a preferred core material is indicated at 80. It will be noted that the loop is not strictly rectangular and the core can be driven beyond the level of the initial saturation level due to the saturation ampere turns. As covered in detail in the above mentioned patent, the particular shape of the curve is of importance in the operation of the device since the collapse of the flux excursion beyond the hysteresis loop level is utilized to produce the voltage which triggers the transistor to initiate flow of reset current. Thus it will be understood that each pulse flowing through the saturating winding 51 tends to increase the magnetism of the core, step by step, to a successively high level. The first step increases the magnetism to the point indicated at 81 in FIG. 3. The ninth step increases the magnetism to the point 89 which is just short of saturation. During each of the first nine steps the amount of collapsing flux at the end of the pulse is small and, in any event, is damped out by the damping resistor 75a. However, upon receipt of the tenth pulse, indicated at 90, saturation is exceeded producing an excess of flux. At the end of the tenth pulse excess flux collapses and induces the triggering voltage in the triggering winding 52 initiating operation of the transistor 60. Because of the fact that the energy level of the incoming pulses fed to the saturating winding 51 has been predetermined by adjustment of the shunting resistor 65 and since such energy level remains precisely constant, in spite of any changes in the voltage supply 36a by reason of the series resistor 70a, the increment of magnetization in each of the steps is accurately maintained so that saturation will always occur between the second to last and the last count. Since perfect accuracy is required in computer practice, it will be apparent that the present counter assembly is ideally suited for use in computers and other digital type control devices.

If desired, the shunt resistor 65 may be adjustable and calibrated so that it may be set to respond to any desired number of counts, say, from 10 to 1.

The present circuit is not at all critical as to the transistor characteristics. In a practical case the transistors may be of a relatively inexpensive junction type such as 2N321. While this circuit has been described in connection with an NPN type of transistor it will be apparent to one skilled in the art that transistors polarized PNP may be used with only minor modification of the circuit, i.e., reversal of the supply voltage.

The above described counter assembly may be used to respond to input pulses which may be either rapidly cyclical up to say 18,000 pulses per second or pulses which are widely separated, e.g., one pulse per day. Reliability of count is unaffected within a wide range of ambient temperature so that the counter may be used in environments unsuited to counters of the conventional type.

I claim as my invention:

1. In a magnetic counter having a pulse former stage and a counter stage with a common ground, each of said stages having a saturable reactor including a saturable core together with saturating triggering and reset windings, and each of said stages further having switch means including a control terminal associated with the triggering winding and an output terminal associated with the reset winding so that upon achieving a condition of saturation the switch is turned on for passage of current through the reset winding for resetting the associated core to negative saturation accompanied by production of an output pulse, the saturating winding of the counter stage being connected in series with the reset winding of the pulse former stage so that the resetting current in the pulse former stage passes through the saturating winding of the counter stage and a shunting resistor connected to the junction between the series connected windings for diverting a predetermined portion of the resetting current away from the saturating winding and to the common ground for production of an output pulse from the counter upon receipt of a predetermined number of impulses at the counter input.

2. In a magnetic counter the combination comprising first and second stages connected in cascade, each of said stages having a saturable reactor including a core having saturating and reset windings and each having an associated switch so arranged that upon receipt by the saturated winding of a particular number of pulses having a particular volt-second integral, saturation occurs actuating the switch for causing reset current to be conducted by the switch through the associated reset winding for resetting the core to negative saturation and accompanied by production of an output pulse, a shunting circuit interposed between the two stages, said shunting circuit including a resistor for causing some of the energy of the output pulses of the first stage to be diverted from the saturating winding of the second stage thereby to establish a predetermined dividing ratio for the second stage.

3. In a magnetic counter the combination comprising first and second stages connected in cascade, each stage having a saturable reactor including a core together with saturating and reset windings and each stage further having a switch so arranged that upon receipt by the saturating winding of a particular number of pulses having a particular volt-second integral, saturation occurs actuating the switch for causing reset current to be conducted by the switch through said reset winding for resetting the core to negative saturation accompanied by production of an output pulse, said stages having a common ground connection, and means including a resistor connected in shunt with the saturating winding of the second stage for shunting to ground a portion of the energy included in the pulses received from the first stage, said resistor being adjustable thereby to change the number of pulses received from the first stage and required for saturation of the second stage thereby to vary the dividing ratio of the counter.

4. In a combined pulse forming and counting circuit the combination comprising a pulse forming stage having a saturable reactor including a saturable core together with saturating and reset windings and an associated switch having an input terminal responsive to the condition of saturation and an output terminal for conducting current through the reset winding for resetting the core to negative saturation accompanied by production of an output pulse, a counter stage having a saturable reactor including a saturable core together with saturating and reset windings, said counter stage having a switch having an input terminal responsive to the condition of saturation in said core and having an output terminal for conducting reset current through the reset winding for resetting the core to negative saturation accompanied by production of an output pulse, and a shunting circuit including a shunting resistor for diverting some of the energy included in the pulses transmitted from the pulse former stage to the counter stage thereby to establish the number of output pulses from the pulse former stage required to produce a single output pulse from the counter stage.

5. In a combined pulse forming and counting circuit the combination comprising a pulse former stage and a counter stage, said pulse former stage having a saturable reactor including a saturable core with saturating, triggering, and reset windings, a transistor having its input circuit connected to the triggering winding and having its output circuit connected in the reset winding so that the transistor is triggered for conduction when the core is saturated by the saturating winding for producing a flow of current through said reset winding for resetting the core to negative saturation, said counter stage having a saturable reactor having a saturable core together with saturating, triggering, and input windings, a transistor in said counter stage having an input circuit coupled to the triggering winding and an output circuit coupled to the reset winding for resetting the reactor to negative saturation upon receipt of a predetermined number of pulses having predetermined volt-second content in said saturating winding, the output circuit of the transistor in the pulse former stage having a series resistor for reducing the amplitude of the peak reset current thereby to reduce the amplitude of the output signal from the pulse former as well as shunting means for shunting a portion of its output signal away from the saturating winding of the counter stage for further reduction of the output signal so that a predetermined plurality of pulses from the pulse former stage are required for production of a single output pulse from the counter stage.

6. In a pulse former the combination comprising a saturable reactor having a saturable core and a saturating winding together with triggering and reset windings, a transistor having an input circuit and an output circuit with its input circuit connected to the triggering winding and its output circuit connected to the reset winding so that upon saturation of the core by successive pulses in said saturating winding the transistor fires to produce flow of reset current in the reset winding to restore the core to a condition of negative saturation and accompanied by a pulse at an output terminal, a source of voltage for the output circuit of said transistor, a resistor interposed in the output circuit of said transistor for reducing the peak value of reset current and thereby insuring that the energy content of the output pulse at the output terminal is substantially constant irrespective of changes in the supply voltage, and means including an adjustable shunting resistor for shunting some of the energy content of the pulses at the output terminal thereby reducing the energy content of the pulses available at such output terminal for feeding a subsequent counter stage.

7. A magnetic counter having an input terminal and an output terminal, said counter including a saturable reactor having a saturable core together with saturating, triggering and reset windings, resetting means including a switch having a control terminal connected to the triggering winding and an output terminal connected to the resetting winding so that upon saturation of the core by pulses received in said saturating winding the switch is turned on to produce current flow in the reset winding for resetting the core to negative saturation accompanied by an output pulse at the output terminal, and shunting means including a shunting resistor associated with the input terminal for diverting a portion of the energy of the pulses received at the input terminal away from the saturating winding thereby to control the number of pulses at said input terminal required to produce saturation of the core.

8. In a magnetic counter the combination comprising a saturable reactor having saturating, triggering and reset windings, an input terminal associated with the saturating winding and an output terminal associated with the reset winding, the transistor having an input circuit and an output circuit with the input circuit being connected to the triggering winding and with the output circuit being connected to the reset winding said output circuit including a source of voltage so that when a condition of saturation is achieved in said reactor by reason of the receipt of a series of pulses at said input terminal the transistor is turned on for flow of current through the reset winding for resetting the core to negative saturation accompanied by production of an output pulse at the output terminal, a shunting resistor associated with the input terminal for shunting away a portion of the energy of the input pulses thereby to control the number of pulses required to produce the condition of saturation, and a series resistor in said transistor output circuit for causing the current through the reset winding to be at a consistent magnitude notwithstanding variations in the voltage of the supply and for production of pulses of predetermined energy content at the output terminal for feeding to successive counter stages.

9. In a magnetic counter having a pulse former stage and a counter stage, each of said stages having a saturable reactor including a saturable core together with saturating triggering and reset windings, and each of said stages further having switch means including a control terminal associated with the triggering winding and an output terminal associated with the reset winding so that upon achieving a condition of saturation the switch is turned on for passage of current through the reset winding for resetting the associated core to negative saturation accompanied by production of an output pulse, the saturating winding of the counter stage being directly connected to the reset winding of the pulse former stage so that at least a portion of the resetting current in the pulse former stage passes through the saturating winding of the counter stage for production of an output pulse from the counter upon receipt of a predetermined number of impulses from the pulse former stage.

No references cited.